OPTICAL DEVICE
Filed Aug. 26, 1950 3 Sheets-Sheet 1
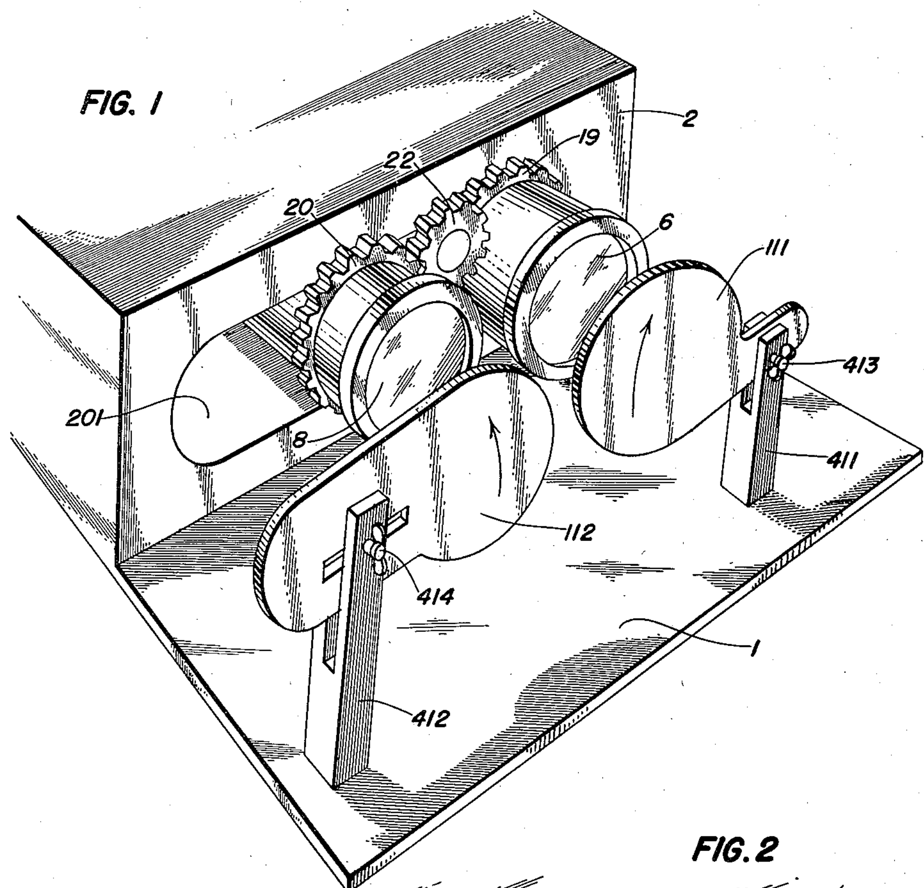
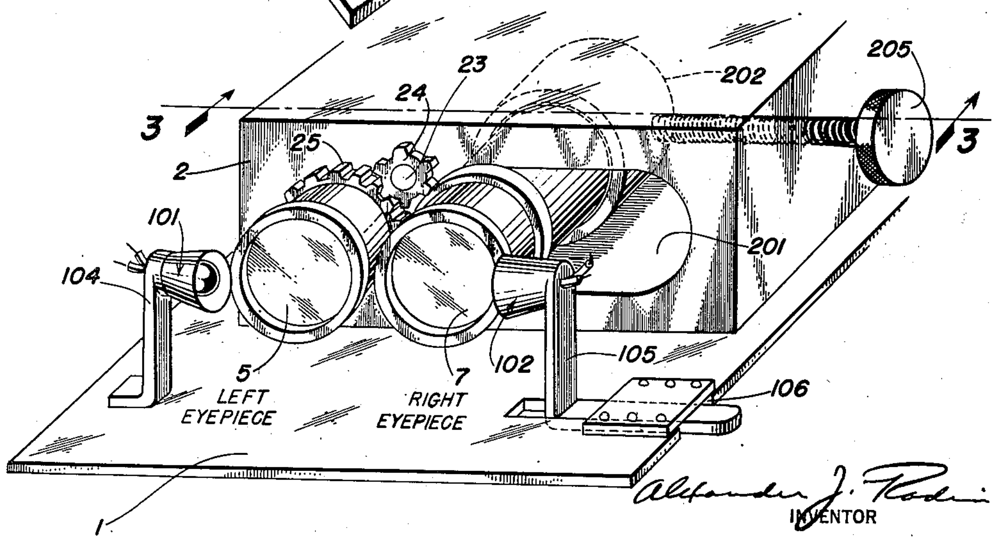
Alexander J. Radin
INVENTOR April 22, 1958 A. J. RADIN 2,831,481
OPTICAL DEVICE
Filed Aug. 26, 1950 3 Sheets-Sheet 2
FIG. 3
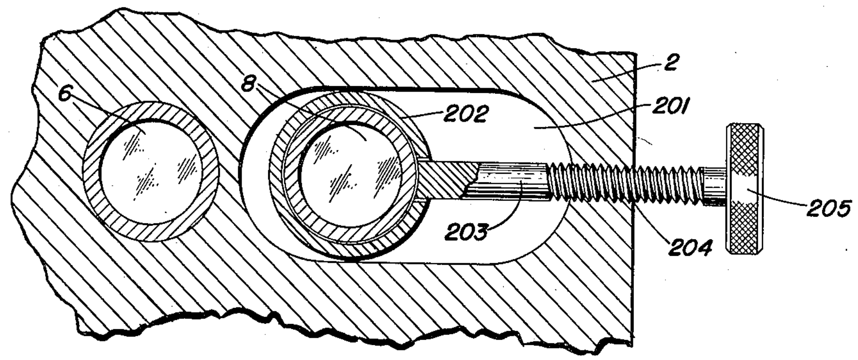
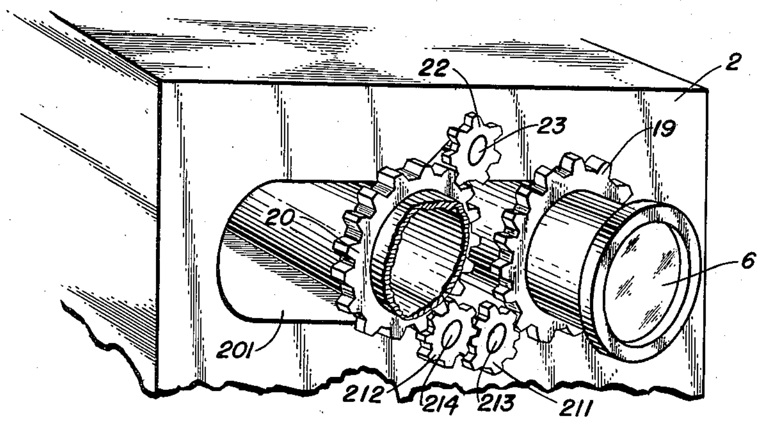
FIG. 4
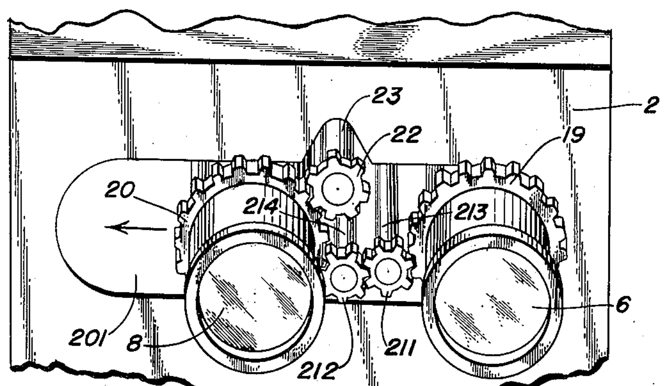
FIG. 5
Alexander J. Radin
INVENTOR April 22, 1958 A. J. RADIN 2,831,481
OPTICAL DEVICE
Filed Aug. 26, 1950 3 Sheets-Sheet 3
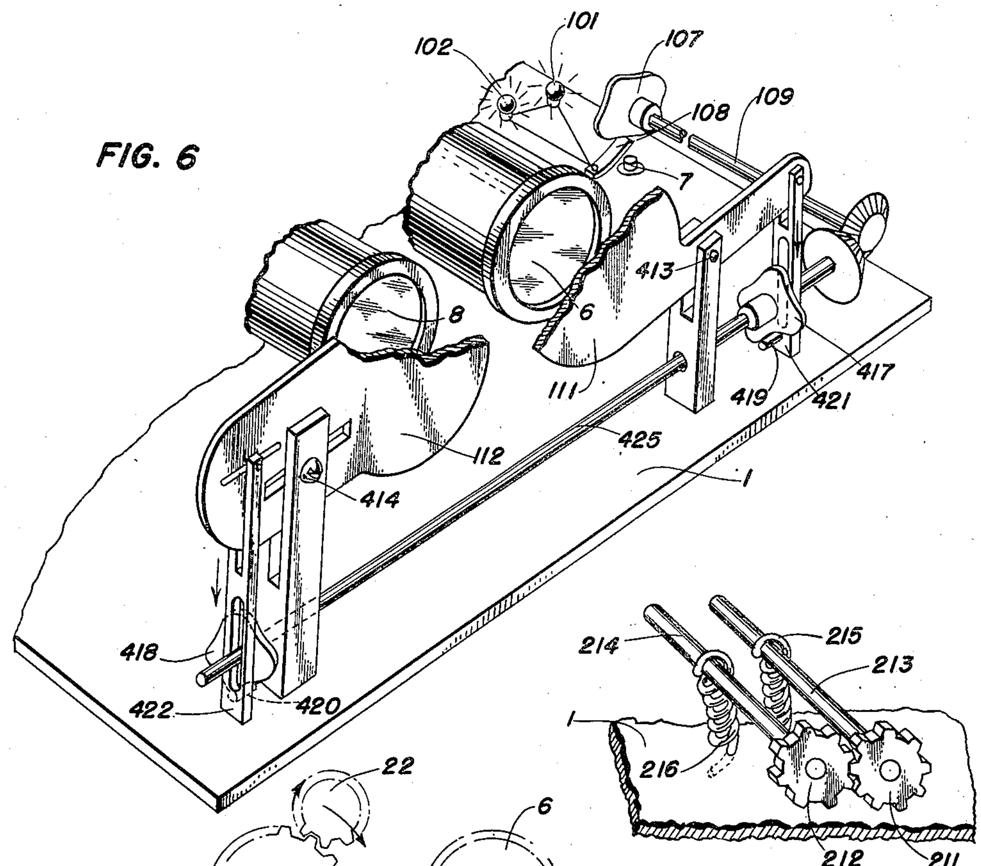
FIG. 6
214
215
213
1
216
212
211
FIG. 10
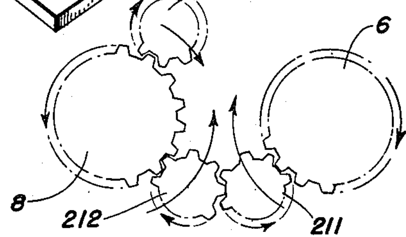
FIG. 7
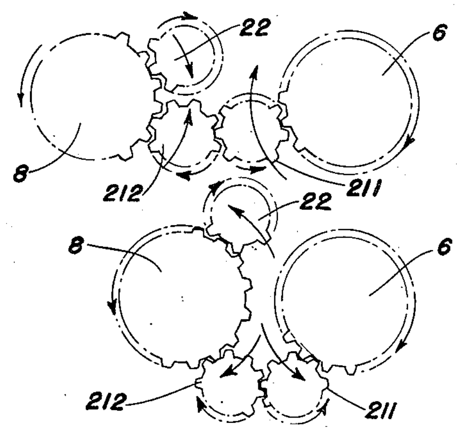
FIG. 8
FIG. 9
Alexander J. Radin
INVENTOR United States Patent Office 2,831,481
Patented Apr. 22, 1958

1

2,831,481

OPTICAL DEVICE

Alexander J. Radin, Brooklyn, N. Y.

Application August 26, 1950, Serial No. 181,643

3 Claims. (Cl. 128—76.5)

This invention relates to orthoptic devices of the type disclosed in my prior United States Letters Patent 2,252,408, issued August 12, 1941, and Patent 2,312,930, issued March 2, 1943.

These patents describe devices for exercising the orbital ocular muscles. Such an instrument may comprise an optical system for each eye, the systems being so operated that the muscles may be tensioned and relaxed cyclically, the rate of operation for each system and the relation between the systems being predetermined, as described in the above-identified patents.

The instant invention relates to improvements in these devices, and more particularly to means for providing a greater flexibility and range in the operating characteristics, whereby the forces acting on the muscles will be varied as desired to achieve more satisfactory results.

For more detailed objects of the invention, reference is made to the accompanying drawings and description.

Fig. 1 is a rear perspective view of a preferred embodiment of my invention in schematic form, with parts omitted for the sake of clarity.

Fig. 2 is a front perspective view of the device of Fig. 1, with parts omitted for the sake of clarity.

Fig. 3 is a vertical section on the line 3—3 of Fig. 2.

Fig. 4 and Fig. 5 are different rear perspective views of the means for adjusting the inter-pupillary distance between the optical systems of the two eyes.

Fig. 6 is another rear perspective view, similar to Fig. 1, showing other working parts.

Fig. 7, Fig. 8, and Fig. 9 are schematic rear elevations of the optical systems, showing the systems in various positions of adjustment, from the point of view of an observer facing the objective portion of the device, that is, looking rearwardly along the line of sight.

Fig. 10 shows a detail for varying the interpupillary distance.

On a base 1 is fixed a vertical support 2 that holds the lenses and associated equipment. The left eyepiece 5 on the front side of the support 2 is associated with its objective 6 on the rear side of the support 2, and the right eyepiece 7 with its objective 8. Each eyepiece is rotatable independently of its objective, and each system independently of the other, as described in the patents hereinbefore mentioned, and further, each lens is removable and replaceable. A motor (not shown), which may be mounted on the base 1, drives a gear 19 fixed relative to the left objective 6. A similar gear 20 is fixed relative to the right objective 8, and a flexible arrangement, to be more fully described hereinafter, permits the gear 19 to drive the gear 20 for selective varying distances between the left objective 6 and the right objective 8. In other words, the optical systems will be operative for differing interpupillary distances, thus permitting use of the device for persons of various ages, sizes, and conditions.

As in the above-mentioned patents, a spur gear 22 on a horizontal shaft 23 meshes with the drive gear 20 and transmits motion to one or the other or both of the eyepieces on the other, or front, side of the support 2. Thus, the left eyepiece 5 is driven by the gear 25 that is activated by the gear 24 on the shaft on which the spur gear 22 is fixed.

2

On the front side of the support 2, shown more particularly in Fig. 2, are shown an electric light 101 for the left optical system, and a second light 102 for the right optical system. Each light is carried by an adjustable bracket 104 or 105 that is movable on the base 1 so as to direct the beam of light directly or indirectly into the associated eye of the person, the purpose being to dilate the pupil during exercise of the ocular muscles. Since the optical systems are adjustable in accordance with the distance between the pupils, the lights 101 and 102 are likewise adjustable to the same degree.

On the rear (objective) side of the support 2 are a pair of shutters 111 and 112, for the left and right optical systems respectively. Each shutter is poised so as to be pivotable directly into the line of sight and thereby obfuscate the vision for that optical system. The shutters 111 and 112 are operable, selectively, together or alternately, and in or out of synchronism with the lights 101 and 102. These shutters are likewise adjustable laterally in accordance with the interpupillary distance.

When a shutter obfuscates the vision of an eye, the muscles of the eye will tend to relax, making the eyeball emmetropic. When the obstruction to vision is removed the muscles will tend to exert pressure on the eyeball so as to achieve focusing, that is, concentration or convergence of the bundle of rays of light to a point on the retina. Hence, as the optical system rotates or oscillates, the muscles will cyclically pull and relax. Similarly, the sequential illumination and darkness due to the activation and deactivation of the light source will diminish and enlarge the pupil, respectively, and so exercise the muscles controlling the pupillary opening. This illumination may be directly into the eye, or indirectly by way of reflection from the target. My device is designed, consequently, to cyclically pull and relax, in a desired adjustable sequence, all the muscles affecting the eyeball, whereby to remedy or diminish the orthoptic defects due to muscle imbalance, desuetude, atrophy, mal-development, or mal-functioning The means for varying the interpupillary distance of the optical systems will now be described. In this arrangement, the shaft 23 and the left optical system do not shift, but the right optical system does shift.

The vertical support 2 is grooved at 201 to afford room for movement of the right optical system. It is obvious, of course, that instead, or in addition, it may be grooved to afford room for movement of the left optical system. A sleeve 202, in which the right optical system may freely operate, is tied to the end of a shaft 203, that may rotate on a horizontal axis. The far end 204 of the shaft 203 is threaded, the threads being adapted to mesh with similar threads in the vertical support 2. A knob 205 is fixed to the shaft 203 to the side of the vertical support 2. It will be apparent, therefore, that manipulation of the knob 205 in one direction about its axis will rotate the shaft 203 to draw the sleeve 202 away from the other optical system, and that manipulation in the opposite direction will slide the sleeve 202 toward the other optical system, thereby providing a desired interpupillary distance to suit the patient.

To maintain operational linkage between the two optical systems for all interpupillary distances in the range of the apparatus, and even while the device is in use, there are provided two similar spur gears 211 and 212, the former being in engagement with the gear 19 that drives the left objective 8, and the spur gear 212 engaging the gear 20 that drives the right objective 8. The gears 211 and 212 are freely mounted, respectively, on horizontal shafts 213 and 214. The shafts 213 and 214 are movable vertically, and coil springs 215 and 216 fixed at their lower ends to the base 1 are biased to urge the shafts upwardly. The construction is such as to mesh the gears 211 and 212 together at all times, and respectively with the gears 19 and 20 at all times.

Hence, if the initial position of the optical systems is represented by Fig. 7, it will be seen that the gears 211 and 212 mesh with each other below the horizontal line joining the axes of the optical systems. The gears 211 and 212 rotate in opposite directions, and so do the objectives 6 and 8, in an opposite sense.

Let it be assumed that the right optical system is extended to increase the interpupillary distance, as represented in Fig. 8. The gears 211 and 212 will creep upwardly between the gears 19 and 20, under the pressure of the springs 215 and 216 on the shafts 213 and 214, but the gears 19, 211, 212, and 20 will still remain in train. The dimensions of the gears and the slot 201 in the vertical support 2 are such that the centers of the gears 211 and 212 approach but do not reach the horizontal line joining the axes of the two optical systems, to the end that when the optical systems are approached, as viewed in Fig. 9, the gears 211 and 212 will be forced downwardly against the pressure of the springs 215 and 216.

The shafts 213 and 214 may be constrained to move in such a way as to always retain their horizontality. If, however, the teeth of the gears 211 and 212 are blurred, or geometrically rounded, the far ends of the shafts 213 and 214 may be pivoted and yet permit the gears 211 and 212 to maintain their engagement. In such an event, there will be a slight decrease in efficiency, but since the transmitted energy is small the loss of power will be negligible. By this system, it is possible to vary the distance between the optical systems while maintaining at all times the operative drive between them.

If the left optical system is to be fixed, as is indicated in Fig. 2, the bracket 104 for the light 101 will also be stationary. The light 101 mounted on the bracket 104 will, nevertheless, be adjustable vertically and horizontally, as well as pivotably, to direct the light rays as desired. In addition to these adjustments, the bracket 105 for the right hand optical system is movable as a whole transversely with respect to the base 1 by virtue of a groove 106 in the latter. This movement may be manual or may be controlled by the movement of the sleeve 202 as the knob 205 is rotated.

The lights 101 and 102 may be turned on and off manually. It is preferable, however, to switch them by means of a cam 107 that actuates a spring electrical contact 108. The cam 107 is operated by a shaft 109 that is powered by the motor. It is obvious that the cam 107 may actuate one or both of the lights 101 and 102, or that separate cams may be utilized to effect any desired timing of illumination.

The shutters 111 and 112 are mounted, respectively, on supports 411 and 412 so as to be pivoted about horizontal pins 413 and 414. These shutters, as hereinbefore described, may be interposed between the objectives 6 and 8 and the target. They are operable manually, or preferably by cams 417 and 418 that ride on pins 419 and 420 fixed to movable arms 421 and 422 that are anchored, respectively, on the shutters 111 and 112. The cams 417 and 418 are fixed on a horizontal shaft 425 that may be driven by the light shaft 109 or directly by the motor. The cams 417 and 418 are so contoured that the periods of light transmission or obfuscation may be varied as desired, both in amount and in frequency. The cams 417 and 418 may be identical, in which case the timing will be identical, or they may differ, in which case the cams will operate in timed relation or periodicity. Of course, the cams 417 and 418, as well as the light cam or cams 107, are removable and replaceable, to produce any operating conditions considered desirable for the patient.

Fig. 1 shows the shutters 111 and 112 mounted for manual operation, and Fig. 6 shows them mounted for automatic operation, the lights 101 and 102 being shown schematically for the sake of clarity. In the latter figure, the horizontal pins 413 and 414 in the supports 411 and 412 serve as pivots for the shutters 111 and 112, respectively. The arms 421 and 422 are held in contact with the pins 419 and 420 by springs or other means, so that the cams 417 and 418 will drive the arms 421 and 422 and thence the shutters 111 and 112.

For those having refractive errors and already wearing glasses, an auxiliary frame may be positioned in front of the support 2 (see Fig. 2), and this auxiliary frame is adapted to hold removable lenses to suit the vision of the particular person. The lenses may bring the vision up to normal, or may be different in each eye or less than normal, or comprise pinhole lenses or the like, and the frame may be adjustable interpupillarily, either by itself or as an adjunct of the shaft 203. Of course, the eyepieces 5 and 6 may themselves comprise the corrective lenses, if desired.

The shutters 111 and 112 are of such size that varying of the interpupillary distance will not interfere with the effect of the shutter. If desired, however, the shaft 425 may be sleeved and keyed, to permit one shutter 112 to be movable along with the right optical system, either manually or by virtue of a linkage with the knob 205.

It will be obvious, therefore, that this apparatus will permit a very wide range in the factors affecting orthoptic treatment, to wit, light impulses, darkness, and muscular tension and contraction, while permitting adaptation, during operation of the apparatus, to patients of different ages, sizes, and visual characteristics. The lenses, shutters, lights, direction of illumination, and frequency of illumination and interruption are all under control, so as to give the best results. Furthermore, a single knob, 205, suffices to vary the interpupillary distance without disarranging the train of lens-actuating gears, the shutters, or the lights.

A preferred embodiment has been described and illustrated herein, but it is intended to include all reasonable modifications and variations that may fall within the terms of the appended claims.

I claim:

1. An optical device comprising a pair of binocular systems, a gear operatively connected to one of said systems for driving said system, a second gear operatively connected to the other system for driving said other system, said systems being laterally movable one with respect to the other while maintaining the parallel relationship of the lines of sight, a pair of continuously-meshed spurs for respectively engaging the gears, a shaft for each of the spurs, the axes of the shafts being substantially parallel and lying in a horizontal plane, said plane being always below the plane of the axes of the optical systems, and means for continuously urging the spurs upwardly while they remain in mesh with the gears.

2. The device set forth in claim 1, wherein the urging means comprises a spring acting on at least one of the spurs.

3. In an optical device, a pair of binocular systems, a shutter for each system to obfuscate the line of vision, means for moving one of the systems and its associated shutter relatively to the other system and its shutter, means for rotating one of the systems while the moving means is in operation, and means for operating each system and each shutter in a desired sequence relative to one another, said last-claimed means comprising a train of gears for rotating the systems, a cam, a pin for pivoting each shutter, and means for synchronizing the gears, pins, and cams to effect the desired sequence.

(References on following page)

References Cited in the file of this patent

UNITED STATES PATENTS

| | | |
|---|---|---|
| 1,221,091 | Richard | Apr. 3, 1917 |
| 1,455,011 | Thompson | May 15, 1923 |
| 1,543,188 | Poser | June 23, 1925 |
| 2,024,194 | Wyckoff | Dec. 17, 1935 |
| 2,057,983 | Spitler | Oct. 20, 1936 |
| 2,089,863 | Updegrave | Aug. 10, 1937 |
| 2,106,918 | Perazzoli | Oct. 11, 1938 |
| 2,132,670 | Young | Oct. 11, 1938 |
| 2,152,050 | Henning | Mar. 28, 1939 |
| 2,205,965 | Updegrave | June 25, 1940 |
| 2,316,139 | Wottring | Apr. 6, 1943 |

FOREIGN PATENTS

| | | |
|---|---|---|
| 439,979 | Great Britain | Dec. 18, 1935 |
| 572,086 | France | Feb. 14, 1924 |